United States Patent [19]

Hart

[11] 4,049,880
[45] Sept. 20, 1977

[54] SELF-GENERATING HALOGEN LIQUIFICATION IN A SECONDARY BATTERY

[75] Inventor: Thomas G. Hart, Royal Oak, Mich.

[73] Assignee: Energy Development Associates, Madison Heights, Mich.

[21] Appl. No.: 695,247

[22] Filed: June 11, 1976

[51] Int. Cl.² ........................................ H01M 10/00
[52] U.S. Cl. .................................... 429/49; 429/51; 429/70; 429/199
[58] Field of Search ..................... 429/51, 50, 70, 81, 429/13, 14, 17, 19, 20, 199, 218, 49, 101

[56] References Cited

U.S. PATENT DOCUMENTS

| 3,713,888 | 1/1973 | Symons | 429/51 |
| 3,809,578 | 5/1974 | Symons | 429/51 X |
| 3,823,036 | 7/1974 | Bjorkman, Jr. | 429/70 |

*Primary Examiner*—Anthony Skapars
*Attorney, Agent, or Firm*—Ostrolenk, Faber, Gerb & Soffen

[57] ABSTRACT

A system which permits self-generating halogen liquifaction in a rechargeable battery and apparatus for use in that system are disclosed. The system includes the use of separate electrolyte flows for the metal electrode and halogen electrode, the electrolyte being separated by a permselective membrane, and a halogen gas accumulator which communicates with the halogen gas being generated at the halogen electrode.

12 Claims, 7 Drawing Figures

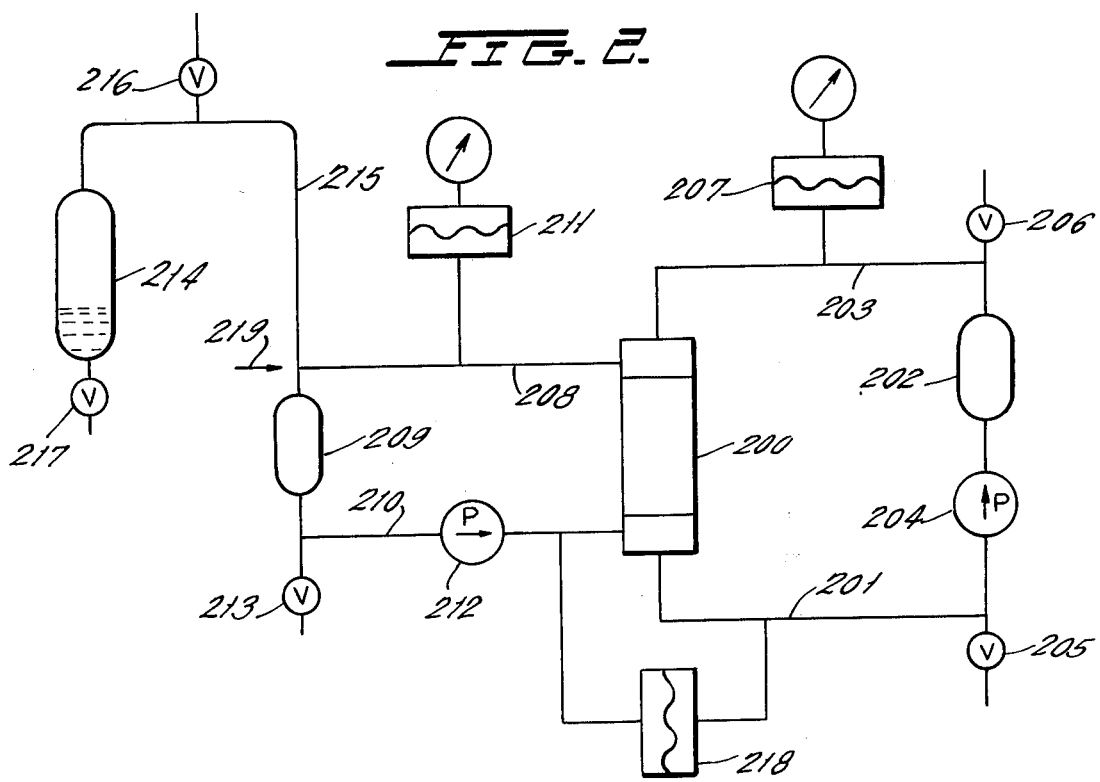
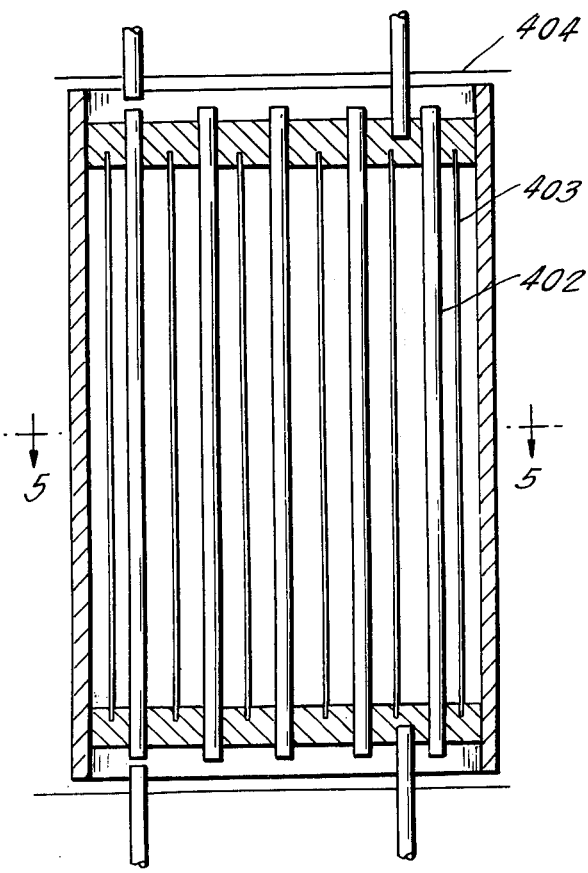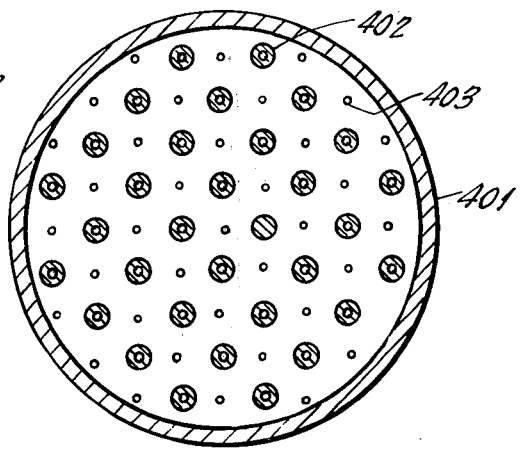

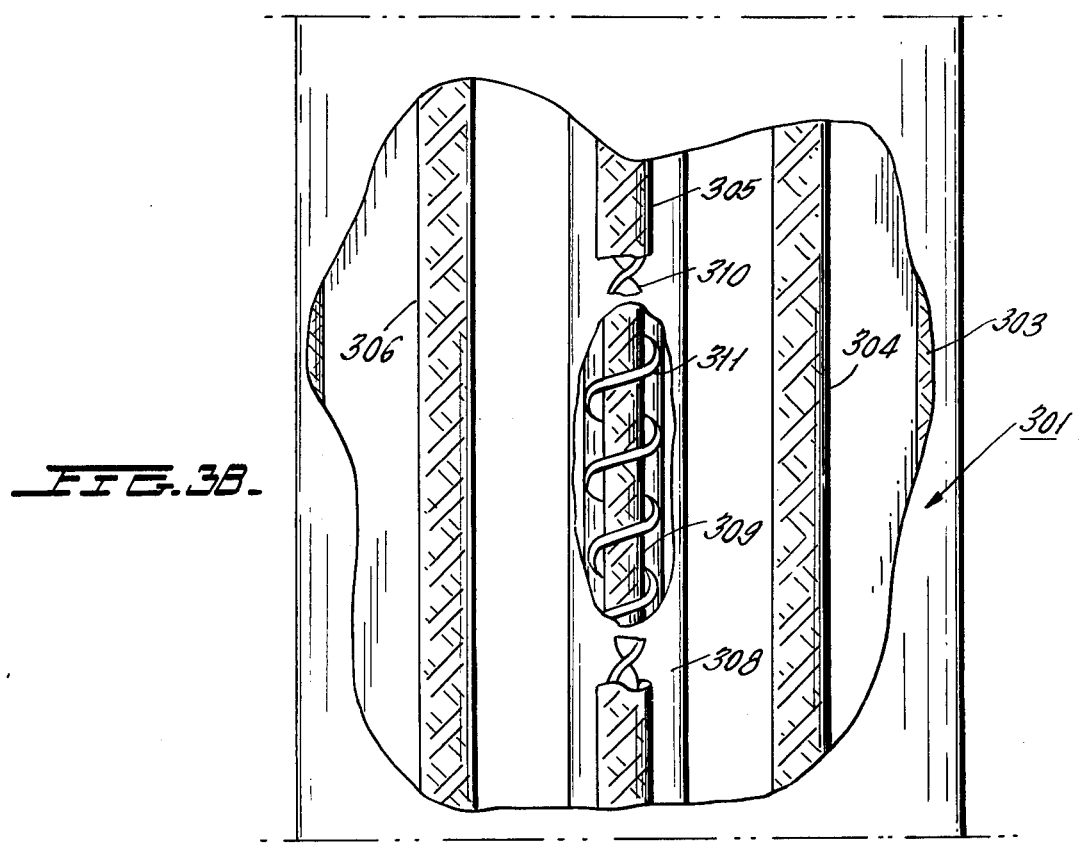
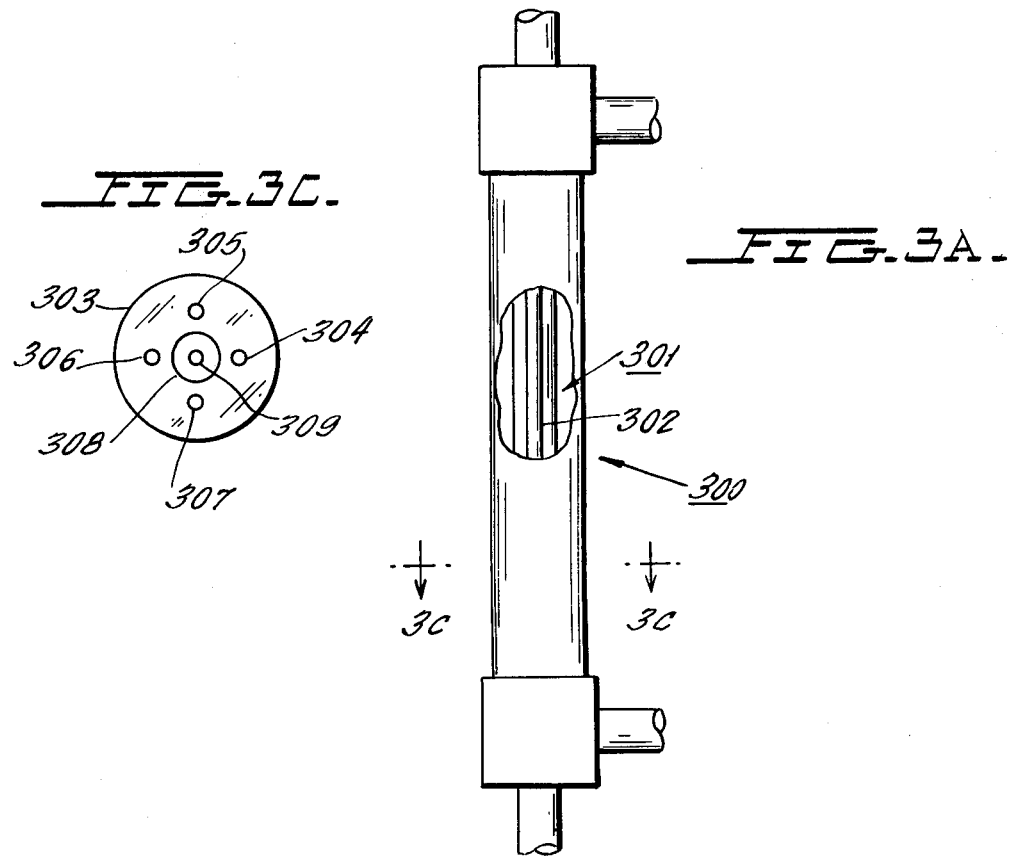

SELF-GENERATING HALOGEN LIQUIFICATION IN A SECONDARY BATTERY

BACKGROUND OF THE INVENTION

High energy density batteries, i.e., those which can produce at least 50 watt hours per pound (for a secondary battery) are desirable in a number of end uses. A number of secondary batteries have been designed to improve energy capacity.

Numerous patents describe the use of aqueous metallic halide solutions as electrolyte with halogens as electroactive materials. One of the earliest patents is U.S. Pat. No. 1,377,722 which describes the use of liquid chlorine under pressure. A good description of such metallic halide secondary batteries can be found in Symons U.S. Pat. No. 3,713,888 which is hereby incorporated by reference. Symons stores the halogen which evolves at the positive electrode during charging by converting the halide into a halogen hydrate. The halogen can also be stored in other forms such as, for example, as the liquid.

Liquifaction of the halogen can be accomplished by employing a much higher than normal pressure at normal temperature, or a much lower than normal temperature at normal pressure, or by employing a moderately higher than normal pressure at moderately lower than normal temperature. For example, U.S. Pat. Nos. 456,843 and 1,377,722 employ much higher than normal pressure and French Pat. No. 133,844 relies on a difference in temperature to achieve liquification.

Each of these alternative methods of halogen liquifaction conventionally require somewhat cumbersome mechanical apparatus for both accomplishing the liquifaction and for isolating the electrochemical elements of the battery from the elevated pressures and/or reduced temperatures used for the liquifaction. In addition to being cumbersome, the conventionally required apparatus can also be very energy wasteful. Accordingly, the use of liquid halogen as a means of practical halogen storage has not been believed to be practical.

It has been discovered that if a halogen gas accumulator is maintained apart from the electrode, and if the metal and halogen electrodes are separated by a cation permselective membrane, and if separate but pressure balance electrolyte flows for the metal and halogen electrodes are utilized, the battery will intrinsically develop a pressure sufficient to liquify the chlorine and there is no need to employ the energy wasteful, cumbersome mechanical apparatus.

Accordingly, it is the object of this invention to provide a system and apparatus for a metal halide secondary battery which will intrinsically develop a pressure sufficient to liquify the halogen generated during charging so that the halogen can be conveniently stored for use during the discharge cycle of the battery.

This and other objects of the invention will become apparent to those of ordinary skill in this art from the following detailed description of the invention in which:

FIG. 2 is a flow diagram of a battery system of this invention;

FIG. 3A is a plan view, with a part cut away, of a second embodiment of the secondary battery of this invention;

FIG. 3B is an enlargement of the circled portion of FIG. 3 showing greater detail;

FIG. 3C is a section view along 3C—3C of FIG. 3A;

FIG. 4 is a cross-section of another electrode assembly according to the present invention; and FIG. 5 is a schematic cross-sectional view of the electrode assembly of FIG. 4 taken along section 5—5 in FIG. 4.

SUMMARY OF THE INVENTION

Figure 1:
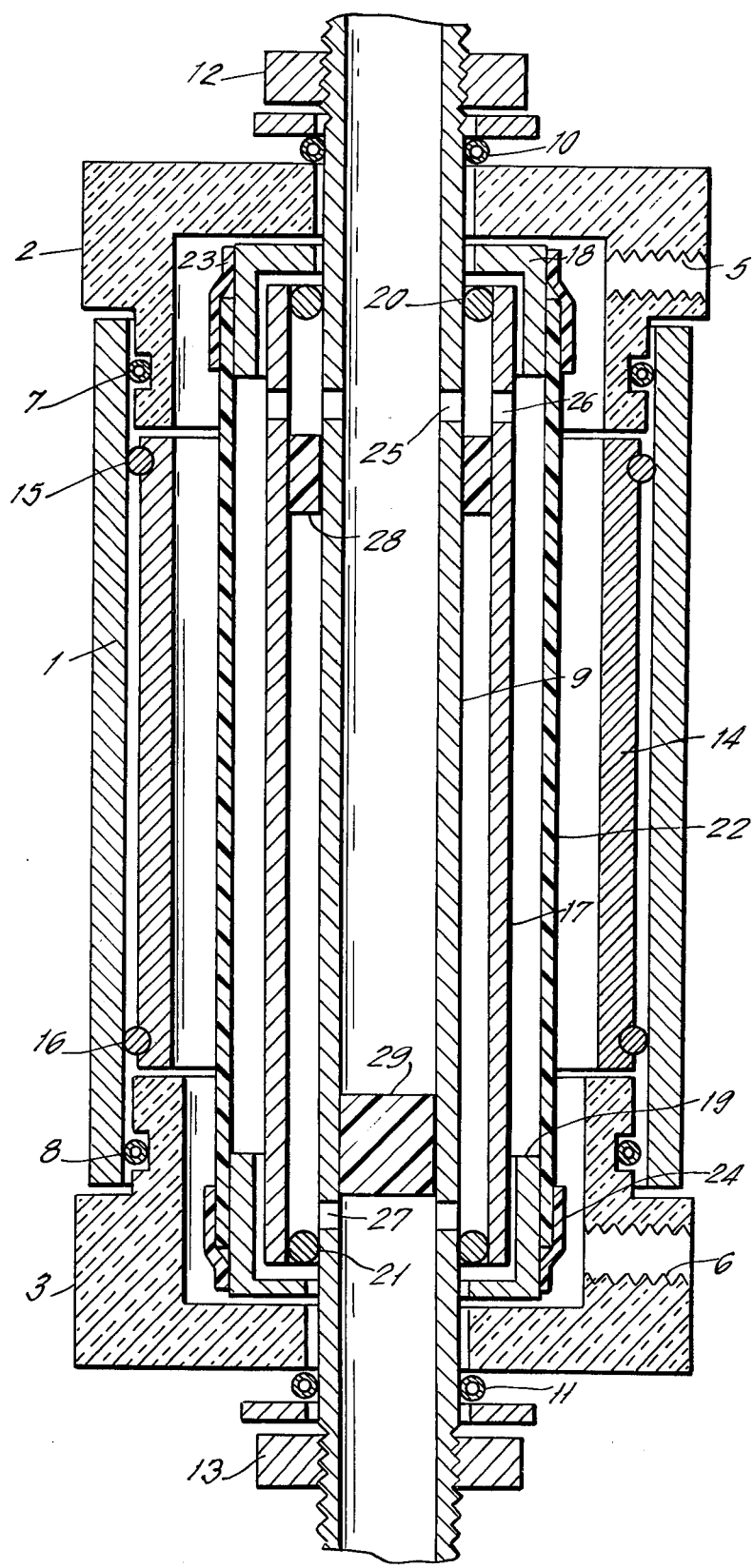
FIG. 1 is a diagrammatic cross-section of one embodiment of the secondary battery of this invention.

This invention relates to a metal halide secondary battery which intrinsically develops a pressure sufficient to liquify the halogen for storage of the same. In general, the battery of the present invention utilizes separate but pressure balanced electrolyte flows for the metal electrode and halogen electrode, which electrolyte flows are separated by a cation permselective membrane, and a halogen gas accumulator which is maintained apart from the electrodes of the battery.

DESCRIPTION OF THE PREFERRED EMBODIMENTS

While the present invention is applicable to all metal halide secondary batteries described in the aforementioned Symons patent, for convenience, the invention will be described in connection with a zinc chloride system. Thus, it will be recognized that each of the metals, electrodes, temperatures, pressures, etc., described in Symons, modified in accordance with the following disclosure can be used in this invention.

In accordance with the present invention, it was discovered that if the fraction of chlorine present at the zinc electrode face during charge is sufficiently reduced, the electrochemical elements of the battery can operate at relatively high pressure while still serving the battery efficiently. Also, if the fraction of chlorine at the zinc electrode is sufficiently reduced, the electrochemical elements are not only relatively insensitive to the effects of pressure, but are also themselves able to develop sufficient pressure by chlorine generation to liquify the chlorine directly at normal temperature in an extremely energy efficient fashion and without the aid of additional mechanical apparatus whatsoever.

The primary means used to reduce the amount of chlorine at the zinc electrode face is a separator which is interposed between the chlorine electrode and the zinc electrode. Such separators are cation permselective, i.e., they are relatively permeable to zinc ions and relatively impermeable to chlorine ions. Separators prepared from a perflorosulphonic acid base, such as those permselective membranes described in U.S. Pat. No. 3,282,875, are preferred for use in this invention.

Although use of a cation permselective membrane in an otherwise unitary electrolyte flow battery will allow self-generated liquifaction, it has been found that good battery performance is obtained only for relatively short charges, a result which is probably due to electrolyte stagnation and the consequent poor quality of the zinc deposit on the zinc electrode. This problem can be overcome if electrolyte stagnation at the zinc electrode face is avoided by causing the electrolyte to flow at least a part of the time between the separator and the zinc electrode. It has further been discovered that an improvement in overall battery performance can be obtained by causing the electrolyte to flow, not only between the separator and the zinc chloride, but also through the zinc deposit itself.

The battery of the instant invention has several unique advantages. In the first instance, the zinc chloride concentration between the chlorine electrode and the separator can be maintained at a level quite different from the concentration between the zinc electrode and the separator because equalization through the permselective membrane is normally relatively low. Therefore, appropriate electrolytic exchange between the chlorine electrode compartment and the zinc electrode compartment allows use of higher than average zinc chloride concentrations without affecting battery performance and resulting generally in higher energy density. Usually, the concentration between the chlorine electrode and the separator is about 10 to 75%, preferably about 15 to 50%, and the concentration in the zinc electrode compartment is about 10 to 75%, and preferably about 15 to 30%. At the start of the charging cycle, the difference in concentration is usually about 75 to 25%, preferably about 50 to 25% and, partly as a result of the ion migration across the separator, the two concentrations are more or less equalized at the end of each charge.

A second unique advantage of the battery is that the chlorine gas bubble accumulation up the face of the chlorine electrode is no longer the main limitation on chlorine electrode height. As a result, a more economical structure is possible by using longer electrodes.

A third unique advantage is that the high pressure leads to high chlorine concentration in the electrolyte and, consequently, to the ability of relative low electrolyte flow rates to deliver sufficient chlorine to the chlorine electrode during discharge. In general, for current densities of 30 ma/cm$^2$, flow rates of about 0.05 to 1.5 ml/minute/cm$^2$, preferably about 0.1 to 0.5 ml/minute/cm$^2$ can be used. The lower flow rates make flow-by chlorine electrodes more practical than they have been heretofore. Additionally, the higher concentration discharge permits the use of woven fiber electrodes, for example, and the economies which result from such use.

FIG. 1 shows one embodiment of the present invention. The battery cell has an outer shell 1 constructed of a suitable conducting material such as titanium. Shell 1 is provided with an upper endcap 2 and a lower endcap 3 made of suitable insulating materials. Upper endcap 2 is provided with a tube connection port 5 and lower endcap 3 is provided with a tube connection port 6. For sealing purposes, Teflon O-rings 7 and 8 are compressed between endcaps 2 and 3, respectively, and shell 1. A flow channel 9 passes through endcaps 2 and 3 and is located centrally of shell 1 and coaxial therewith. Channel 9 is constructed of a suitable conducting material such as titanium, and is secured in position within openings in caps 2 and 3. Channel 9 is sealed relative to caps 2 and 3 by means of O-rings 10 and 11 which are compressed against the outer surface of endcaps 2 and 3 by nuts 12 and 13. An electrode 14 of suitable material such as graphite is tightly fitted inside shell 1 and makes electrical contact with shell 1 by means of wire rings 15, 16 which are positioned between electrode 14 and shell 1. A second electrode 17 is positioned between tubular channel 9 and electrode 14 and held in position by means of caps 18, 19 at its ends. Electrical contact between electrode 17 and the central channel member is effected by wire rings 20 and 21.

A separator 22 is positioned between electrodes 14 and 17. Separator 22 can, for example, be made of Nafion, a perflorosulphonic acid based permselective plastic material, about ten mils thick, which is formed into a cylinder. The ends of separator 22 are held against the outer surface of caps 18, 19 by means of Teflon tape 23, 24. Toward the upper end of channel 9, a set of holes 25 is provided. A similar set of holes 26 is provided near the upper end of electrode 17 near holes 25. At the bottom of tubular member 9, another set of holes 27 are provided. In order to maintain the spacial relationship between electrode 17 and tubular member 9, a tubular blocking piece 28 is provided therebetween slightly below holes 25 and 26. A blocking piece 29 is also provided in tubular channel 26 slightly above holes 27.

The cell of FIG. 1 operates in the following fashion. Electrode 14 is the chlorine electrode and the chlorine electrode electrolyte enters the cell through port 6, flows up the cell between electrode 14 and separator 22, and then exits through port 5. Electrode 17 is the zinc electrode and the zinc electrode electrolyte enters the bottom of member 9 and is prevented from traveling completely through member 9 by blocking piece 29. The electrolyte flows through holes 27 and is prevented from flowing between electrode 17 and member 9 to holes 25 by blocking piece 28. Therefore, the electrolyte flows through porous electrode 17 and any zinc deposited thereon, through the space between electrode 17 and separator 22, through holes 26 and 25 and then exits the cell through the upper part of member 9. Electrical connection to chlorine electrode 14 is made by clamping suitable wires on to shell 1 and electrical connection to the zinc electrode 17 is made by clamping suitable contact wires on to either the upper or lower parts of member 9.

FIG. 2 illustrates diagrammatically a battery system which is used in conjunction with the cell of FIG. 1. The cell of FIG. 1 is shown by reference numeral 200. Cell 200 has separate chlorine electrolyte and zinc electrolyte loops. The zinc electrolyte loop contains a conduit 201 connecting cell 200 with an electrolyte reservoir 202, and a conduit 203 leading from reservoir 202 back to cell 200. An electrolyte flow pump 204 is provided in conduit 202 and, also, a valve 205 is provided in conduit 201 for introducing new electrolyte into the system. Conduit 203 is provided with a venting valve 206 and a suitable pressure gauge 207.

The chlorine electrolyte loop contains a conduit 208 connecting cell 200 to an electrolyte reservoir 209 and a conduit 210 connecting reservoir 209 back to cell 200. A suitable pressure gauge 211 is provided in conduit 208. An electrolyte flow pump 212 and a valve 213 for introducing fresh electrolyte into the system are provided in conduit 210. A liquid chlorine reservoir 214 is connected to conduit 208 through a conduit 215, which contains a venting valve 216. The liquid chlorine reservoir 214 is also provided with a venting valve 217. In order to equalize the pressure between the chlorine electrolyte flow loop and the zinc electrolyte flow loop, a flexible diaphragm 218 is provided therebetween.

In operation, about 50% aqueous zinc chloride electrolyte is charged into the chlorine loop through valve 213 and air is expelled through valves 216 and 217 until the electrolyte loop, including chlorine reservoir 214, is full. Zinc chloride electrolyte of about 25% concentration is then charged to the zinc electrode loop by means of valve 205 while air is expelled through valve 206.

When the loops are completely filled with electrolyte and all air expelled, pump 212 is set to flow at about 30 ml per minute around the chlorine electrode loop (equivalent to about 1 ml per minute per 1 cm$^2$ of chlorine electrode surface) and pump 204 is adjusted to flow at a rate of about 10 ml per minute around the zinc electrode loop (equivalent to about 1 ml per minute per 2 cm² of zinc electrode surface). A sufficient positive voltage is then applied to the chlorine electrode relative to the zinc electrode to cause a current of about 30 ma/cm² of zinc electrode to flow. Typically, the voltage required is between 2.4 and 2.6 volts, depending upon the thickness and conditioning of separator 22. As the electrolyte in the chlorine electrode loop saturates with chlorine and pressure begins to build, as indicated equally by gauges 207 and 211, electrolyte is vented from the chlorine reservoir 214 by means of valve 217 until reservoir 214 is completely emptied of electrolyte and filled with chlorine gas. This operation is typically started about 15 minutes after voltage is applied and requires about 45 minutes to complete.

All of the valves are then securely closed and the charge (deposition of zinc on the zinc electrode and coincident release of chlorine at the chlorine electrode) is allowed to proceed uninterrupted for the remainder of the charge period, typically about 6 hours. This remainder of the charge period automatically divides itself into two distinct phases. During the first phase, the pressure throughout the system rises steadily until liquifaction pressure is reached (about 90 psig at 27° C.). Typically, the first phase requires 2 to 3 hours. During the second phase, which occupies the remainder of the charge period, the pressure remains constant as the liquifaction pressure in liquid chlorine accumulates in reservoir 214. Liquid chlorine forms only in reservoir 214 and not in the remainder of the apparatus because the heat which results from various inefficiencies, including pump inefficiency, raises the temperature in the remainder of the apparatus a few degrees above the temperature of reservoir 214. Generally, the temperature is substantially constant through the system, i.e., not varying by more than about 5° C.

To discharge the battery, the voltage imposed across the electrodes is disconnected and a resistance load is substituted. The same pumping rate for pumps 204 and 212 as served for the charging phase is appropriate for the discharging phase, at least so long as there is liquid chlorine in reservoir 214. During discharge, the chlorine transfers into the electrolyte at the gas-liquid interface, which is typically at about the position in conduit 215 indicated by arrow 219. The rate and efficiency of the discharge is a function of the area of the gas-liquid interface in conjunction with the flow rate of pump 211.

The coulombic efficiency of the apparatus and system shown in FIGS. 1 and 2 is typically about 75% and the overall voltaic efficiency can also be around 75%. However, to obtain this high figure requires very low discharge rates, partly because of the limited gas-electrolyte interface and partly because of the inefficient flow-by operation of the chlorine electrode 14 (i.e., the ability to extract and use chlorine from the electrolyte circulating past the electrode). The efficiency of electrode 14 is greatly improved by introducing some turbulence into the flow past the electrode as, for example, by serrating the electrode surface. However, a preferred way of improving the discharge efficiency of the chlorine electrode is to use an electrode structure and flow arrangement in accordance with the preferred embodiments described below.

A preferred electrode is shown in FIGS. 3A, 3B and 3C. This embodiment uses longer electrodes than are used in conventional low pressure zinc chlorine battery systems and, additionally, the longer electrodes are of woven fiber graphite material instead of the conventional compacted granual graphite material, which leads to increased energy density and substantial cost reductions. In FIG. 3A, 300 is the complete fiber electrode cell. Cell 300 can be substituted directly for cell 200 shown in FIG. 2 and charged and discharged in substantially the same way. Reference numeral 301 represents a broken away part of the cylindrical outer case revealing the inside electrode structure 302, which is shown enlarged in FIG. 4B.

Referring consecutively to FIGS. 3B and 3C, 303 the outer case of the electrode. There are four chlorine electrodes as shown in FIGS. 3C, 304, 305, 306 and 307. The four chlorine electrodes are located on a common diameter surrounding a permselective membrane separator 308 which, in turn, surrounds a zinc electrode 309 which lies along the central access of cell 300. In FIG. 3B, a part of chlorine electrode 305 and separator 308 have been broken away so as to show the zinc electrode 309.

Referring to FIG. 3C, the space between outer case 303 and separator 309, and including the space within the chlorine electrodes, is the chlorine electrolyte flow space. The space between separator 308 and the zinc electrode 309, including space within the zinc electrode is the zinc electrolyte flow space.

In this embodiment, the four chlorine electrodes and the zinc electrodes are lengths of woven graphite fiber sleeving. In order to stiffen the electrode so as to maintain spacings and to improve the electrical conductivity without substantially impeding the flow within the electrodes, spiralled titanium tape 310 is employed. Additionally, a Teflon monofilament 311, about 15 mils in diameter is wrapped around the outside of the zinc electrode 309 with about four turns per inch so as to maintain a uniform space between the zinc electrode 309 and separator 308.

The endcap arrangements of the cell of FIGS. 3, and the means by which electrical connections are made separately to the zinc electrode and chlorine electrodes are similar to the connections of the cell of FIG. 1.

As mentioned above, the cell of FIGS. 3 can be substituted directly for cell 200 in the system of FIG. 2 and charged and discharged in identical fashion. The cell of FIG. 3 has a larger charge capacity than that of FIG. 1, mainly due to the larger electrode area, and has a much higher discharge efficiency, especially at higher current densities, due mainly to the higher chlorine-use efficiency of the woven fiber chlorine electrodes.

A preferred assembly utilizing the electrodes illustrated in FIGS. 3 contains a plurality of the electrode cells 300 within a common casing without casing 303. This is shown very diagrammatically in FIGS. 4 and 5. Thus, within a common casing 401, a plurality of the separator 308 and zinc electrode structure 309 of FIG. 4 is shown as 402. Each of the chlorine electrodes 304, 305, 306 and 307 is shown as 403. It will be observed that essentially all of the separator-zinc electrodes are surrounded by four chlorine electrodes, and essentially all of the chlorine electrodes are surrounded by four of the separator-zinc electrode structures. The common casing 401 is provided with a top 404 and a bottom 405. A typical assembly as illustrated diagrammatically in FIGS. 4 and 5 will contain about 180 electrodes spaced 60 mils apart and have a capacity of 250 watt hours.

The operation of the system shown in FIGS. 4 and 5 is the same as described heretofore.

In addition to the advantages of the high pressure self-generating liquification system of this invention noted above, there is another important general advantage. Because of the relatively modest liquid pumping and refrigeration requirements, the zinc chloride battery system of this invention can be contained within a single container substantially without external auxiliary equipment. Thus the liquid chlorine storage, electrode assembly, and zinc chloride reservoirs can be held within a single pressure type envelope; the electrolyte circulation can be by means of internal circulators driven by chlorine gas en route to and from liquid storage; and temperature control, foreign gas venting, electrolyte concentration equalizing and temperature and pressure monitoring can be effected by means which do not significantly breach the single container for the chlorine storage, electrode assembly and electrolyte reservoir.

The single container self-generating liquification zinc chloride battery system described above is especially well suited to use in vehicles because its intrinsic high energy density and compact nature greatly facilitate provision of adequate safety features. Such safety features include, for example, (a) storing the liquid chlorine within the portals of a porous low heat conductivity material (e.g., high porosity porous Teflon) so as to reduce both the spread and vaporization rate of the liquid if exposed; (b) surrounding the common container for the liquid chlorine, electrolyte assembly and electrolyte reservoirs with a material capable of assimilating the entire amount of stored chlorine without excessive temperature rise (e.g., calcium hidroxide dispersed in a low density, high strength porous material such as foamed Lexan); and (c) enclosing the entire package in a shatter proof, high tensile strength container, made, e.g., of inorganic ballistic felt.

Accordingly, a safe, relatively cheap zinc chlorine vehicle battery with such desirable attributes as an energy density of 51 hours per pound is possible in accordance with this invention.

It will be recognized by those skilled in the art that various changes and modifications can be made in the battery and battery system described without departing from the spirit and scope of the invention. For example, the invention is also applicable to batteries employing hydrogen halide, usually hydrogen chloride, as the electrolyte. Accordingly, it will be understood that the various embodiments disclosed herein were for the purpose of illustration only and were not intended to limit the invention.

I claim:

1. In the method of storing halogen generated during the charging phase of a rechargeable battery for use during the discharging phase thereof, said battery employing a halide containing electrolyte and electrodes for the cation and halogen, the improvement which comprises separating the electrodes by a cation permselective membrane, furnishing halide containing electrolyte to the electrode for the cation and electrode for the halogen in separate but pressure balanced flows, transporting the halogen gas generated during charging to a pressure tight area maintained apart from the electrodes, and allowing the halogen gas to liquify at ambient temperature under the autogenuous pressure developed and without external pressure control.

2. The method of claim 1 wherein the concentration of the halide in the electrolyte furnished to the electrode for the cation at the beginning of the charging phase is different from the concentration of the halide furnished to the electrode for the halogen.

3. The method of claim 2 wherein the electrolyte furnished to the electrode for the cation is caused to flow through said electrode.

4. The method of claim 2 wherein said electrodes are woven fiber electrodes.

5. The method of claim 2 wherein said halide is zinc chloride.

6. The method of claim 1 wherein said halide is hydrogen halide.

7. The method of claim 1 wherein said pressure tight area contains liquid electrolyte at the start of said charging phase and the halogen gas transported to said pressure tight area causes the liquid electrolyte to be displaced therefrom.

8. The method of claim 1 wherein the temperature is substantially the same throughout the battery.

9. A halide rechargeable battery comprising a first and second electrode compartments separated by a common cation permselective membrane; a first electrode within said first compartment; first liquid electrolyte storage means; first means to circulate liquid electrolyte between said first storage means and first compartment; second electrode within said second compartment; second liquid electrolyte storage means; second means to circulate liquid electrolyte between said second storage means and second compartment; a liquid halogen storage means communicating with said second storage means and located apart from said first and second compartments and first and second storage means, said liquid halogen storage means comprising a pressure tight compartment within which gaseous halogen can liquify at ambient temperature.

10. The battery of claim 9 wherein said first and second electrodes are fiber electrodes.

11. The battery of claim 9 wherein said first means is adapted to circulate said electrolyte at a rate different from the circulation rate in said second means.

12. The battery of claim 9 wherein said first compartment contains a plurality of said first electrode and a plurality of said second compartments each of which contain said second electrode.

* * * * *